United States Patent
Nakajo et al.

(10) Patent No.: US 12,249,717 B2
(45) Date of Patent: Mar. 11, 2025

(54) CARBONACEOUS MATERIAL DISPERSION AND METHOD FOR PRODUCING THEREOF

(71) Applicant: REFINE HOLDINGS CO., LTD., Gifu (JP)

(72) Inventors: Masaru Nakajo, Tokyo (JP); Mitsuhiro Iwafune, Tokyo (JP); Kensuke Fukasawa, Tokyo (JP); Takao Suzuki, Tokyo (JP); Tomokiyo Takeyama, Tokyo (JP)

(73) Assignee: REFINE HOLDINGS CO., LTD., Gifu (JP)

( * ) Notice: Subject to any disclaimer, the term of this patent is extended or adjusted under 35 U.S.C. 154(b) by 105 days.

(21) Appl. No.: 17/365,387

(22) Filed: Jul. 1, 2021

(65) Prior Publication Data
US 2022/0006093 A1    Jan. 6, 2022

(30) Foreign Application Priority Data

Jul. 3, 2020 (JP) ................................. 2020-115485

(51) Int. Cl.
| | |
|---|---|
| *C09C 3/08* | (2006.01) |
| *C09C 1/48* | (2006.01) |
| *C09C 3/10* | (2006.01) |
| *H01M 4/13* | (2010.01) |
| *H01M 4/62* | (2006.01) |
| *H01M 10/052* | (2010.01) |

(52) U.S. Cl.
CPC ............. *H01M 4/625* (2013.01); *C09C 1/48* (2013.01); *C09C 3/08* (2013.01); *C09C 3/10* (2013.01); *H01M 4/13* (2013.01); *H01M 10/052* (2013.01)

(58) Field of Classification Search
CPC ...................................................... C09C 3/08
See application file for complete search history.

(56) References Cited

U.S. PATENT DOCUMENTS

2015/0118560 A1 *  4/2015  Ewald ................... H01M 4/136
                                                     429/221
2019/0177551 A1 *  6/2019  Nagai ....................... H01B 1/24

FOREIGN PATENT DOCUMENTS

| | | |
|---|---|---|
| JP | 10-310795 | 11/1998 |
| JP | 2015-030777 | 2/2015 |
| JP | 2016-046188 | 4/2016 |
| JP | 2018-045820 | 3/2018 |
| WO | 2014/042266 | 3/2014 |

OTHER PUBLICATIONS

Notice of Reasons for Refusal issued in JP Patent Application No. 2020-115485, Feb. 14, 2024, translation.

* cited by examiner

*Primary Examiner* — Stuart L Hendrickson
(74) *Attorney, Agent, or Firm* — GREENBLUM & BERNSTEIN, P.L.C.

(57) ABSTRACT

The disclosed is a method for producing a dispersion of carbonaceous material in a nonaqueous solvent comprising a nitrogen-containing heterocyclic amide compound with a solvent purity of 99.9% or higher, which comprises:
confirming an amine-controlled concentration, in which the concentration of amine components in the nonaqueous solvent is confirmed to be less than $3 \times 10^{-6}$ in mass fraction;
confirming a moisture-controlled concentration, in which the concentration of the moisture concentration in the nonaqueous solvent is confirmed to be less than $5 \times 10^{-4}$ in mass fraction; and
dispersing a carbonaceous material added to the nonaqueous solvent that satisfies the conditions in the amine-controlled concentration confirmation and the moisture-controlled concentration confirmation so that the carbonaceous material concentration is 15 to 30% by mass based on the total mass of the dispersion, by stirring and mixing.

15 Claims, 1 Drawing Sheet

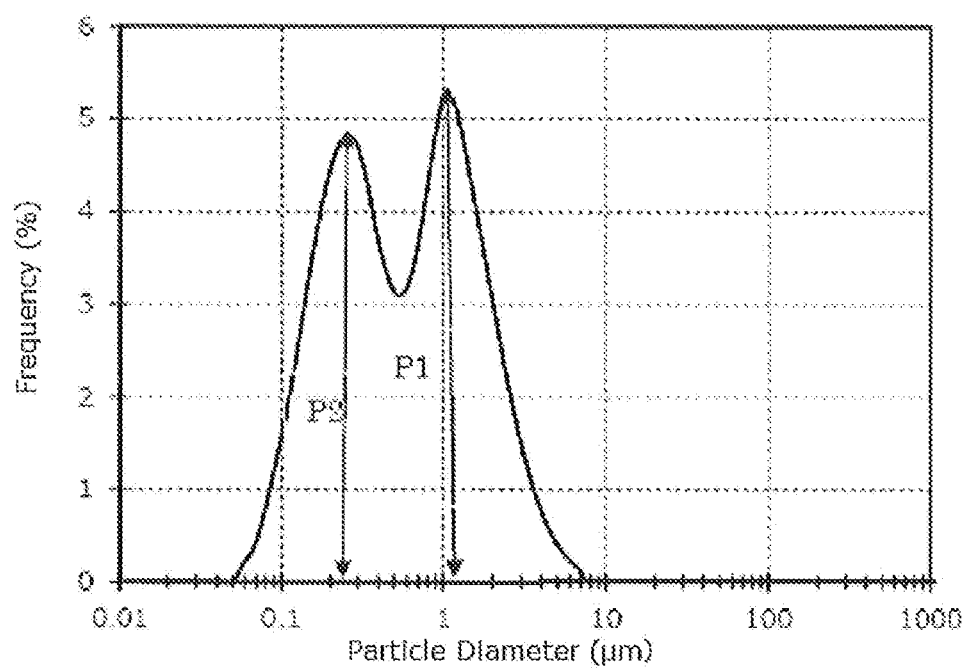

CARBONACEOUS MATERIAL DISPERSION AND METHOD FOR PRODUCING THEREOF

CROSS-REFERENCE TO RELATED APPLICATIONS

This application is based on and claims priority to Japanese Patent Application No. 2020-115485 filed on Jul. 3, 2020, which is hereby incorporated by reference as if set forth in its entirety herein.

TECHNICAL FIELD

The present invention relates to a carbonaceous material dispersion and a method for producing thereof. In detail, the present invention relates to a dispersion of carbonaceous material that is suitably used as a conductive auxiliary agent for forming electrode layer in the field of batteries, particularly in the production of lithium-ion secondary batteries, and a method for producing thereof.

BACKGROUND ART

In recent years, high-capacity and high-power lithium-ion secondary batteries have been widely used in many fields, such as electronic devices, e.g., portable personal computers, smartphones, and cell phones, or automobiles, e.g., electric and hybrid vehicles. For the further development of these fields, higher performance of lithium-ion batteries and more efficient production processes are required.

Electrodes used in lithium-ion batteries are generally manufactured by coating a slurry for electrode onto an electric collector, drying up it, and then pressing it to form a compacted electrode. The electrode slurry is prepared by mixing an electrode active material, a conductive auxiliary agent, a binder, etc., in a solvent.

In order to efficiently prepare such an electrode slurry, it has been proposed to use a carbonaceous material dispersion in which the carbonaceous material, which is a conductive auxiliary agent, is dispersed in a solvent in advance (e.g., Patent Literatures 1-3). When the carbonaceous material dispersion is used to prepare an electrode slurry, kneading of the carbonaceous material dispersion and the electrode active material becomes easy, and an electrode with good conductivity in which the carbonaceous material is uniformly dispersed can be obtained.

For example, in the cathode for lithium-ion secondary batteries, as a cathode active material, a lithium transition metal composite oxide such as lithium cobaltate or lithium manganate, which electron conductivity, i.e., electrical conductivity, per se is meager, is used. Therefore, carbonaceous materials such as carbon blacks, graphite, carbon nanotubes, carbon nanofibers, etc. are added to the electrodes as conductive auxiliary agents to add conductivity to the lithium transition metal composite oxides.

As for the properties required of carbonaceous material dispersions, for example, Patent Literature 4 describes that the dispersion state of the carbonaceous material such as carbon black in carbonaceous material dispersions mixed with cathode agent paste affects battery performance.

When the carbonaceous material dispersion is made into a paste so as to be mixed with the cathode active material, it is preferable to have a low viscosity to make it easier to mix. The lower the viscosity of the carbonaceous material dispersion, the better it is for pre-treatment to remove impurities, such as filtering, in order to prevent contamination of other metal particles, etc., in the battery material. On the other hand, to manufacture the electrode, the amount of solvent should be small because the solvent needs to be dried out in the end.

In order to prepare a paste for the cathode, the cathode active material and the conductive auxiliary agent must be evenly mixed and dispersed so that the conductive auxiliary agent remains conductive. In addition, a binder component such as polyvinylidene fluoride resin (PVdF) is dissolved for providing adhesion to the metal foil. Incidentally, a non-aqueous solvent such as N-methyl-2-pyrrolidone (NMP) is used as a solvent.

In the past, amine compounds, which are volatile pH-adjusting agents, have been added to achieve the above-mentioned low viscosity in the carbonaceous material dispersion. However, the addition of such amine compounds did not stabilize the properties of the carbonaceous material dispersions and did not result in a constant viscosity.

Incidentally, in Patent Literature 5, with respect to a technology for formation of a water- and weather-resistant film on a base material, wherein polyvinylidene fluoride is dissolved in a nitrogen-containing heterocyclic amide compound solvent such as 2-pyrrolidone and N-methyl-2-pyrrolidone, and the resultant resin dissolved solution is applied to a surface of the base material, such as a metal plate or resin molded body, it has been reported that, the resin dissolved solution tended to be colored by a small amount of impurities contained in the nitrogen-containing heterocyclic amide compound solvent, and the film formed using the solution became colored, and thus, for example, when a resin container with this film was used as a transport container for precision components of LEDs and ICs, the presence of impurities in the film could cause malfunctions in electronic devices and automotive parts that incorporated these precision components, and in order to solve this problem, it has been proposed to use the nitrogen-containing heterocyclic amide compound that have been (i) contacted with a solid acidic substance in advance, or (ii) recovered by distillation after contact with an acidic substance. It has been further reported that these impurities that caused coloration were not removed by simply distilling the nitrogen-containing heterocyclic amide compound, but the problem of coloration was eliminated by using the compound treated by the above method.

PRIOR ART DOCUMENT

Patent Literature

Patent Literature 1: JP 2015-30777 A
Patent Literature 2: JP 2016-46188 A
Patent Literature 3: JP 2018-45820 A
Patent Literature 4: International Publication WO2014/042266
Patent Literature 5: JP HEI10-310795 A (1998)

SUMMARY OF THE INVENTION

Problem to be Solved by the Invention

As mentioned above, in conventional carbonaceous material dispersions, stability of performance, high concentration and uniform dispersion of carbonaceous materials, and easy coating were required, but none of them had enough satisfactory characteristics for practical use.

Therefore, the present invention aims to provide an improved carbonaceous material dispersion. The present invention also aims to provide a carbonaceous material dispersion that is suitable as a conductive auxiliary agent dispersion for lithium-ion secondary batteries and a method for producing the same. The present invention further aims to provide a carbonaceous material dispersion in which the carbonaceous material is highly concentrated and uniformly dispersed and can be easily applied to coating and a method for producing the same. The present invention further aims to provide a carbonaceous material dispersion that can stably demonstrate very excellent electrical properties when used as a conductive auxiliary agent for lithium-ion secondary batteries and a method for producing the same.

Means for Solving the Problem

In order to preparing a carbonaceous material dispersion which solves the above problems, we, the inventors, have conducted intensive studies and investigations. As a result, we have found that nitrogen-containing heterocyclic amide compounds such as N-methyl-2-pyrrolidone often contain amine components as impurities. When the carbonaceous material dispersion was used to form electrodes for lithium-ion secondary batteries, it was found that the impurities amine components sometimes caused problems such as coating problems due to the inability to achieve a certain predetermined viscosity for each lot.

As mentioned above, a binder component such as polyvinylidene fluoride (PVdF) is added to the electrode paste for providing adhesion to the metal foil, and N-methyl-2-pyrrolidone and other nitrogen-containing heterocyclic amide compounds are solvents that can dissolve the binder component such as polyvinylidene fluoride resin. However, some of the amine components contained as impurities in nitrogen-containing heterocyclic amide compounds are likely to cause a defluoridation reaction with basic substances when moisture is present, since polyvinylidene fluoride resin is a fluorinated resin. In fact, the amine component, which has a stronger effect on the polyvinylidene fluoride resin, tends to be colored, and the change in the UV absorption spectrum also increases. As a result of our investigation using the UV absorption spectrum as an indicator, we have also found that the degree of influence on polyvinylidene fluoride resin varies depending on the type of amine.

From these points of view, we, the inventors have developed a method to control the concentration of amine components and water content in the nitrogen-containing heterocyclic amide compound, such as N-methyl-2-pyrrolidone, used as a nonaqueous solvent in the production of carbonaceous material dispersion so that the concentration of amine components and water content are below a predetermined level. By using a nonaqueous solvent that satisfies these specified conditions, the carbonaceous material dispersion can be prepared with a low viscosity even when the carbonaceous material concentration is as high as 15 to 30% by mass. In addition, when the resulting carbonaceous material dispersion is used in the production of electrode slurry for lithium-ion secondary batteries, for example, the viscosity of the slurry is constant from lot to lot, and electrodes with excellent electrical characteristics can be formed in a stable manner.

In the present invention, a predetermined amine compound, which is a volatile pH adjuster, may be added as necessary to achieve low viscosity. However, said predetermined amine compound is an amine compound that has little effect on polyvinylidene fluoride resin, etc., as a binder and is highly effective in dispersing carbonaceous materials. After eliminating unspecified amine compounds contained as impurities in the nitrogen-containing heterocyclic amide compound such as N-methyl-2-pyrrolidone, which is a nonaqueous solvent, the predetermined amine compound can be added to prepare the electrode slurry. By eliminating the unspecified amine compound contained in the heterocyclic amide compound and adding the specified amine compound, we succeeded in maintaining the inherent function of the binder concurrently with achieving a stable mixing state when the carbonaceous material dispersion is mixed with the cathode active material and the binder in preparing the electrode slurry. As a result of these efforts, the concentration of amine components is always under control during the final production of cathode paste, and the variation in viscosity from lot to lot has been suppressed, resulting in a drastic reduction in problems during production.

Namely, the present invention provides a technology to embody a method for producing carbonaceous material dispersion which solves the above-mentioned problem, in a nonaqueous solvent comprising a nitrogen-containing heterocyclic amide compound with a solvent purity of 99.9% or higher, which comprises:

confirming an amine-controlled concentration, in which the concentration of amine components in the nonaqueous solvent is confirmed to be less than $3 \times 10^{-6}$ in mass fraction;

confirming a moisture-controlled concentration, in which the concentration of the moisture concentration in the nonaqueous solvent is confirmed to be less than $5 \times 10^{-4}$ in mass fraction; and dispersing a carbonaceous material to the nonaqueous solvent that satisfies the conditions in the amine-controlled concentration confirmation and the moisture-controlled concentration confirmation so that the carbonaceous material concentration is in a range of 15 to 30% by mass based on the total mass of the dispersion, by adding the carbonaceous material to the nonaqueous solvent, and stirring and mixing them.

In an embodiment of the method for producing a carbonaceous material dispersion, the nitrogen-containing heterocyclic amide compound is one of 2-pyrrolidones.

In an embodiment of the method for producing a carbonaceous material dispersion, the nitrogen-containing heterocyclic amide compound is N-methyl-2-pyrrolidone.

In an embodiment of the method for producing a carbonaceous material dispersion, a resin-based dispersant is added as a dispersant.

In an embodiment of the method for producing a carbonaceous material dispersion, a predetermined amine compound is added as a dispersant.

In an embodiment of the method for producing a carbonaceous material dispersion, the carbonaceous material is carbon black.

In an embodiment of the method for producing a carbonaceous material dispersion, the dispersing of the carbonaceous material to the nonaqueous solvent is carried out in such a way that two or more particle size peaks are formed when the dispersion is measured by a laser diffraction particle size analyzer.

The invention that solves the above problem is also embodied in a carbonaceous material dispersion obtained by the above mentioned method for producing a carbonaceous material dispersion, wherein a concentration of the carbonaceous material is in the range of 15 to 30% by mass based on a total mass of the dispersion, a concentration of amine components in the dispersion excluding a predetermined amine compound added as necessary is less than $3 \times 10^{-6}$ in mass fraction, and the moisture concentration in the dispersion is less than $1 \times 10^{-3}$ in mass fraction.

In an embodiment of the carbonaceous material dispersion of the present invention, the carbonaceous material is carbon black and the nitrogen-containing heterocyclic amide compound is N-methyl-2-pyrrolidone.

In an embodiment of the carbonaceous material dispersion of the present invention, a viscosity the dispersion is in a range of 50 to 500 mPa·s.

In an embodiment of the carbonaceous material dispersion of the present invention, peaks of particle size of carbonaceous material are formed in two or more locations when measured by a laser diffraction particle size analyzer.

In an embodiment of the carbonaceous material dispersion of the present invention, wherein peaks of particle size of carbonaceous material are formed in two or more locations when measured by a laser diffraction particle size analyzer, and a ratio of heights of the main two peaks P1 and P2 (P1:P2) of these peaks is in a range of 1:0.7 to 0.7:1.

Effect of the Invention

According to the present invention, it is possible to obtain a highly dispersed, low-viscosity, carbonaceous material dispersion that can exhibit good electrical properties at low solvent content.

BRIEF DESCRIPTION OF THE DRAWINGS

FIG. 1 is a graph showing the particle size distribution of one embodiment of the carbonaceous material dispersion.

EMBODIMENTS FOR CARRYING OUT THE INVENTION

Now, the present invention will be described in detail, based on embodiments.

<Method for Producing Carbonaceous Material Dispersion>

The method for producing a carbonaceous material dispersion according to the first aspect of the present invention is a method for producing a dispersion of carbonaceous material in a nonaqueous solvent comprising a nitrogen-containing heterocyclic amide compound with a solvent purity of 99.9% or higher, which comprises:

confirming an amine-controlled concentration, in which the concentration of amine components in the nonaqueous solvent is confirmed to be less than $3 \times 10^{-6}$ in mass fraction;

confirming a moisture-controlled concentration, in which the concentration of the moisture concentration in the nonaqueous solvent is confirmed to be less than $5 \times 10^{-4}$ in mass fraction; and dispersing a carbonaceous material to the nonaqueous solvent that satisfies the conditions in the amine-controlled concentration confirmation and the moisture-controlled concentration confirmation so that the carbonaceous material concentration is in a range of 15 to 30% by mass based on the total mass of the dispersion, by adding the carbonaceous material to the nonaqueous solvent, and stirring and mixing them.

(Nitrogen-Containing Heterocyclic Amide Compound)

The nitrogen-containing heterocyclic amide compound used in the present invention include, for example, 2-pyrrolidones as shown in the following general formula (I)

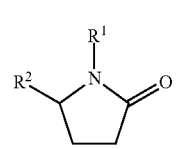

(wherein, $R^1$ and $R^2$ represent independently hydrogen or an alkyl group having 1 to 4 carbons.)

Specifically, the 2-pyrrolidones include, for example, 2-pyrrolidone, N-methyl-2-pyrrolidone, N-ethyl-2-pyrrolidone, N-propyl-2-pyrrolidone, N-butyl-2-pyrrolidone, 5-methyl-2-pyrrolidone, 5-ethyl-2-pyrrolidone, 5-propyl-2-pyrrolidone, etc. These can be used singly or in combination of any two or more members. Among these 2-pyrrolidones, N-methyl-2-pyrrolidone is particularly preferred.

The nitrogen-containing heterocyclic amide compounds used in the present invention, especially N-methyl-2-pyrrolidone, are not limited to any particular synthesis method or supply route, but the synthesis method or supply route where the amine components and water as impurities are not easily mixed in the product is basically desirable.

For example, N-methyl-2-pyrrolidone can be produced by the following synthetic method and purified by adsorption or distillation, if necessary (newly manufactured product), although it is not particularly limited.

As the manufacturing method for N-methyl-2-pyrrolidone (NMP), for example, a method where NMP is produced by mainly reacting γ-butyrolactone (GBL) with methylamine in a shaft-type reactor at 200-350° C. under about 10 MPa (Ullmann's Encyclopedia of Industrial chemistry, 5th Ed., Vol. A22, pp. 458-459);

a method where γ-butyrolactam (2-pyrrolidone, γ-BL) is produced from GBL by a complete reaction with liquid ammonia at 270° C. and about 120 bar, e.g., in a cascade of three stirred reactors (selectivity: 94 mole %), and NMP is formed similarly with methylamine (Winnacker, Kuechler, "Chemische Technologie", 4th ed. 1982, vol. 6, p. 99, lines 5-9);

a method where NMP is formed by reacting γ-BL with excess monomethylamine (MMA) at 250 to 300° C. in the presence of water, for example, as described in JP HEI10-158238 A (1998);

a production method for NMP by reaction of γ-BL with excess MMA, as described in JP HEI1-190667 A (1989);

a method for synthesizing NMP by heating γ-BL or its open-chained derivatives with dimethylamine (DMA) and/or trimethylamine (TMA) at 200° C. or higher, as described in JP HEI7-218751 A (1995); and a method where a corresponding lactone is reacted with a secondary amine in the presence of water to produce an N-alkylated lactam via the corresponding N,N-dialkyl-omega-hydroxycarboxamide as an intermediate. N-alkylated lactams via hydroxycarboxamides, as described in JP HEI1-186864 A(1989) (Note that, according to Example 1 in this patent unexamined publication, the reaction of γ-BL with aqueous DMA afforded NMP in 60% yield and γ-hydroxybutyric acid methylamide is additionally formed. In one further example of this publication, a 60% yield of NMP is also reported in the corresponding reaction of γ-BL with DMA.);

a method where N-alkylated lactam is produced by reacting the corresponding lactone with tertiary amine or tertiary or quaternary ammonium compound in the presence of water and removing the corresponding alcohol, as described in JP HEI1-186863 A(1989) (Note that, according to Example 1 of this patent unexamined publication, the reaction of γ-BL with aqueous TMA afforded NMP in 8% yield and a large amount of by-products, such as methyl amide of γ-hydroxybutyric acid, 2-pyrrolidone and γ-hydroxybutyric acid have been formed.);

a method for synthesizing NMP by reacting GBL and MeNH$_2$ together in the presence of water, as described in JP SHO47-21420 B (1972).

a method for synthesizing NMP by reacting GBL with MeNH$_2$ at 220-290° C. and 6 MPa, as described in Chem. Abstracts 124:145893 (CN-A-1104635) (a batchwise reaction of GBL, a mixture of 30% concentration of aqueous MeNH$_2$ and water, in a ratio of 1:1.4:5.6, at 280° C. and 6 MPa affords NMP in 97% yield.);

a method for the continuous production of NMP by reacting GBL with MMA in the liquid phase in three successive reaction steps, wherein the first step is operated at a temperature of 150-220° C., the second step at a temperature of 220-270° C., and the third step at a temperature of 250-310° C., the pressure of all three steps is 30-90 ATE (30.4 and 91.2 bar), preferably 40-60 ATE (40.5 and 60.8 bar), and the molar ratio of GBL to MMA is 1:1.05 to 1:1.4, as described in WO99/52867;

a method of production by reacting 1 part of GBL with 2 parts of MMA and 2 to 4 parts of water (=molar ratio 1:5.5:9.6 to 19.1) at 200 to 300° C., especially at 230 to 300° C. (2 hours), as described in Chem. Abstract 82: 13994;

a method of reaction of GBL with MMA and water in a 1:1.4:4 mixture (molar ratio=1:3.9:19.1) at 250° C. and 45-50 kg/cm$^2$, as described in Chem. Abstract 87:5802;

a method of purification of NMP by treatment with alkali metal hydroxide in an aqueous solution followed by distillation, as shown in U.S. Pat. No. 2,964,535; and a method for continuous production of NMP by reacting GBL and MMA in the liquid phase, using GBL and MMA in a molar ratio of 1:1.08 to 1:2, and reacting at a temperature of 320 to 380° C. and an absolute pressure of 70 to 120 bar;

may be exemplified as non-limiting examples. The related parts in the description of above references are incorporated herein by reference.

Alternatively, for example, it is possible to use a regenerated product obtained through a distillation and refinement process from the waste liquid of N-methyl-2-pyrrolidone used in the manufacturing process of lithium-ion secondary batteries, the coating process in which the polyvinylidene fluoride resin dissolved solution is coated on the surface of base materials such as metal plates and resin molded bodies, or any other process.

Among these, the regenerated products obtained from the waste liquid from the lithium-ion secondary battery manufacturing process are particularly preferred because they are easy to control both the amine component concentration and the moisture concentration. In particular, regenerated products obtained from the waste liquid from the manufacturing process such as a lithium-ion secondary battery manufacturing process using a carbonaceous material dispersion produced by the manufacturing method according to the present invention are the most desirable. In other words, it is preferable to apply the manufacturing method according to the present invention again to the recycled product obtained from the waste liquid of the manufacturing process using the carbonaceous material dispersion produced by the manufacturing method according to the present invention.

The nitrogen-containing heterocyclic amide compound used as a nonaqueous solvent in the present invention is assumed to contain impurities mainly in the amine compounds and water as described below, but it is also desirable that it be free of other components as much as possible. In this sense, it is desirable to have a purity of at least 99.9%, and more preferably 99.95% or higher. Herein, this purity is measured by Karl Fischer moisture meter and gas chromatography.

(Carbonaceous Material)

In the method for producing a carbonaceous material dispersion according to the present invention, the carbonaceous material to be used is not particularly limited as long as it can have an electrical conductivity, and can be presented in a powdered or granulated form. For instance, carbon black (CB), carbon nanotubes (CNT), carbon nanofiber (CNF), graphene, natural graphite, artificial graphite, hardly graphitizable carbon, cokes, graphite, etc. can be exemplified and they may be used singly or in combination with two or more materials. As the carbon material, CB is particularly preferred. Furthermore, as the CB, for example, furnace black, channel black, acetylene black, thermal black, etc., are involved, any of which can be used. Among them, the acetylene black is preferable because it has an inherently low metallic component content due to its producing process.

Here, as the carbon black, oxidized carbon black and graphitized carbon black, which treatments are ordinary applied, can also be used. The oxidation treatment of carbon black is a treatment in which oxygen-containing polar functional groups such as phenol groups, quinone groups, carboxyl groups, and carbonyl groups are directly introduced (covalently bonded) to the surface of carbon black by treating the carbon black at high temperature in air or by secondary treating with nitric acid, nitrogen dioxide, ozone, etc. This process improves the dispersibility of carbon black.

The carbonaceous material can also be subjected to dry magnetic separation to remove metallic impurities that may be introduced prior to the production of the carbonaceous material dispersion, and/or wet magnetic separation after dispersing in a nonaqueous solvent as a carbonaceous material dispersion, if necessary.

Herein, the "powdered and/or granulated" form of the carbonaceous material as a raw material dispersed in the nonaqueous solvent is not particularly limited as far as it can be dispersed in the nonaqueous solvents as described above. In addition, the shape of the particles is not limited to a roughly spherical shape, but can also include an oval shape, flakes, needles or short fibers, irregular shapes, etc.

As explained on the website of the Carbon Black Association (https:/carbonblack.biz/index.html), the smallest unit of carbon black that cannot be broken down is the aggregate (primary aggregate). The smallest unit of carbon black that cannot be broken down is an aggregate (primary aggregate), and a part of it (domain) is commonly called a particle. This particle is considered to be a particle defined as the smallest unit in nanomaterials, but it is only a part of an aggregate. Aggregates are made up of agglomerates (secondary aggregates) due to physical forces such as van der Waals forces. In addition, most carbon black products are transported and sold in the form of beads, which are processed by compression and granulation processes to prevent scattering and improve handling.

For example, it can include primary aggregates with an average particle size of 10-100 nm, secondary aggregates with an average particle size of 0.1-100 μm by agglomeration of such primary aggregates, and processed particles with an average particle size of 500-5000 μm by compression or granulation for easier handling.

From the viewpoint of carbon black conductivity, aggregates in which primary particles are linked to some extent to form a chain or tuft-like structure are preferred as conductive carbon particles. The linkage of primary particles in the aggregate is also called a structure, and the degree of development of the structure can be ascertained by measuring the particle size distribution (dynamic light scattering or laser diffraction/light scattering) or by observation with an electron microscopy (either scanning or transmission type can be used). Such a structure can efficiently form conductive paths between cathode active material particles. Therefore, excellent conductivity can be provided to the cathode active material layer with a smaller amount of the carbonaceous material used.

(Confirmation of the Amine-Controlled Concentration and Confirmation of Moisture-Controlled Concentration)

In the producing method according to the present invention, the amine-controlled concentration confirmation and the moisture-controlled concentration confirmation are first conducted to confirm the concentration of amine components and the moisture concentration of the nonaqueous solvent with a purity of 99.9% or higher to be used.

These confirmations of the amine and moisture-controlled concentrations can be performed for each lot of nonaqueous solvents used, or they can be performed on nonaqueous solvent samples taken through a sample collection channel at constant or arbitrary intervals in a continuous manufacturing plant.

The amine-controlled concentration confirmation process and the moisture-controlled concentration confirmation process can be done separately or can be performed simultaneously.

The amine-controlled concentration confirmation is usually performed using ion chromatography. This can be performed by using a calibration curve to quantify all peaks of amine species that are expected to be mixed in beforehand, or by the internal standard method, standard addition method, etc. In this way, it is confirmed whether the concentration of amine components in the aforementioned nonaqueous solvent meets the criteria of being less than $3 \times 10^{-6}$ in mass fraction, preferably less than $2 \times 10^{-6}$, and even more preferably less than $1 \times 10^{-6}$. The reason for setting such an amine-controlled concentration is that if the concentration of amine components in the aforementioned nonaqueous solvent is more than $3 \times 10^{-6}$ in mass fraction, the carbonaceous material dispersion may become unstable. Furthermore, when the prepared carbonaceous material dispersion is blended with a binder component as described below, there is a possibility that the viscosity may vary from lot to lot, resulting in reduced workability. Here, when, as a part of the unspecified amine species contained as impurities in the nonaqueous solvent, for example, ethylenediamine, cyclohexylamine, dipropylamine, 2-ethylpiperidine, morpholine, or the like are included, although the kind of amines are not particular limited thereto, it is considered that the influence on the viscosity of the carbonaceous material dispersion as described above becomes higher. However, by controlling the concentration of amine components in nonaqueous solvents to be less than $3 \times 10^{-6}$ in mass fraction as described above, even if such highly influential amines are included as impurities, the desired improvement effect can be achieved.

In the case of adding a predetermined amine compound as a dispersant when preparing a carbonaceous material dispersion as described below, the concentration of amine components, i.e., the amine controlled concentration herein said, does not include the concentration of the predetermined amine compound, but is the total amount of other amine components (if the same compound as the predetermined amine compound was originally contained as an impurity in the nonaqueous solvent used, the total of the amount added later as a dispersant and the amount that was originally present as an impurity would be excluded from the calculation of the amine controlled concentration.).

The moisture-controlled concentration confirmation can be carried out using, for example, a Karl Fischer moisture concentration meter or a near-infrared absorbance type micro moisture concentration meter, refractive index concentration meter, etc. Alternatively, it can be performed by gas chromatography using an ionic liquid column with higher accuracy. By doing so, it is confirmed whether the moisture concentration in the aforementioned nonaqueous solvent meets the criterion of a mass fraction of less than $5 \times 10^{-4}$, preferably less than $2 \times 10^{-4}$, and even more preferably less than $1 \times 10^{-4}$. The reason for setting such a moisture-controlled concentration is that, in the carbonaceous material dispersions of the present invention, the solvent (in the sense of including the moisture) in the dispersions is usually removed in the end in manufacturing products using said carbonaceous material dispersion. Therefore, a high amount of water in the solvent may cause problems in the manufacturing process of such products. Furthermore, when the prepared carbonaceous material dispersion is blended with a binder component as described below, the presence of water in the nonaqueous solvent may have a significant effect on the viscosity variation of the blended product as described above.

When the nonaqueous solvent to be used is judged to meet the criteria in both the amine-controlled concentration confirmation and the moisture-controlled concentration confirmation, the process proceeds to the dispersing step in which the carbonaceous material is dispersed in this nonaqueous solvent.

On the other hand, when the nonaqueous solvent is determined not to meet the criteria in both or either the amine-controlled concentration confirmation process or the moisture-controlled concentration confirmation process, the nonaqueous solvent will not be used directly in the dispersion process.

The failure-determined nonaqueous solvent may be applied for (1) distillation purification; (2) contact with acidic substance, such as mineral acids such as sulfuric acid, nitric acid, phosphoric acid, and hydrochloric acid; water-soluble inorganic acids such as isopoly acids and heteropoly acids such as heteropolyphosphoric acid, tungstic acid, and molybdosilic acid; water-insoluble inorganic solid acids such as zeolite, alumina, silica-alumina, silica-magnesium oxide, silica-zirconium oxide, etc.; acidic pretreated activated carbon; water insoluble acidic cation exchange resins such as strong acidic cation exchange resins; organic carboxylic acids such as acetic acid, propionic acid, butyric acid, succinic acid, lactic acid, malic acid, oxalic acid, etc.; or (3) purifying treatment such as distillation purification after contact with acidic substances, and then subject to the amine controlled concentration confirmation and the moisture controlled concentration confirmation again.

Of course, the use of said failure-determined non-aqueous solvent can be discontinued and another new non-aqueous solvent can be subjected to the amine-controlled concentration confirmation and moisture-controlled concentration confirmation.

(Dispersion Process)

When the nonaqueous solvent is judged to meet the criteria in both the amine-controlled concentration confirmation and the moisture-controlled concentration confirmation, the carbonaceous material is added to the nonaqueous solvent, stirred and mixed to disperse it, so that a carbonaceous material dispersion is prepared in which the carbonaceous material concentration is in a range of 15 to 30% by mass based on the total mass of the dispersion.

As for the concentration of carbonaceous material to the total mass of the dispersion, 16 to 28% by mass is further preferred, and 18 to 25% by mass is particularly preferred. If the concentration of carbonaceous material is lower than the above, there is an increase in the energy required for solvent removal in product manufacturing, and an increase in the cost of transporting the dispersion and the cost of the solvent. On the other hand, if the concentration of carbonaceous material is higher than the above, it becomes difficult to obtain sufficient fluidity and handling becomes poor.

The dispersing apparatus used for preparing carbonaceous material dispersion is not particularly limited, and for example, any disperser normally used for pigment dispersion, etc. can be used. For example, mixers such as disper, homomixers, and planetary mixers, homogenizers ("Clermix" manufactured by M Technique Co., Ltd., "FILMIX" manufactured by PRIMIX Corporation, "Abramix" manufactured by Silverson, etc.), paint conditioners (manufactured by Red Devil, etc.), colloid mills ("PUC Colloid Mill" manufactured by Probst & Class GmbH & Co. KG, "Colloid Mill MK" manufactured by IKA Process Technology, etc.), cone mills ("Cone Mill MKO" manufactured by IKA Process Technology, etc.), ball mills, sand mills ("Dyno Mill" manufactured by Shinmaru Enterprises Corporation, etc.), attritors, pearl mills ("DCP Mill" manufactured by Nippon Eirich Co., Ltd, etc.), coball mills and other media type dispersion mills, Wet type jet mills ("JIINASU PX" manufactured by JIINASU KK., "Star Burst" manufactured by Sugino Machine Limited, "Nanomizer" manufactured by NANOMIZER Inc., etc.), media-less dispersers ("Clare SS-5" manufactured by M Technique Co., Ltd., "MICROS" manufactured by Nara Machinery Co., Ltd., etc.), roll mills, etc., are exemplified, but are not limited thereto.

Preferably, it is desirable that the dispersion is prepared by finally dispersing the carbonaceous material in a media mill, particularly in a media mill using beads with an average particle diameter in the range of 0.05 to 2 mm. Even more preferably, it is prepared by using a shear-type dispersing device, as described in detail below, prior to the dispersing treatment using such a media mill, and followed by the treatment using the media mill.

If the particle size of the beads used in the media mill is too small, carbonaceous materials such as primary aggregates of carbon black may be broken into small pieces, and excessive energy is required for the dispersion process. Therefore, it is preferable that the average particle diameter of the beads is not less than 0.05 mm, and not less than 0.5 mm is particularly preferable because handling becomes difficult. On the other hand, if the beads are too large, the number of beads per unit volume will be reduced, resulting in lower dispersion efficiency, insufficient pulverization of the carbonaceous material, and the presence of carbonaceous material particles with a large aspect ratio, which may result in the inability to obtain liquidity as a paint or coating agent. For this reason, it is preferable that the average diameter of the beads be not more than 2 mm, and especially preferable that it be not more than 1.5 mm.

The material of the beads used as dispersion media in media mills is not particularly limited, and examples include alumina, zirconia, steel, chrome steel, glass, etc. Among these, considering contamination of the product and the magnitude of kinetic energy due to the specific gravity, etc. it is preferable to use zirconia beads.

The shape of the beads is not particularly limited, but generally spherical beads are used.

The structure of the media mill is not particularly limited, and various known media mills can be applied. Specifically, various known media mills such as attritors, sand mills, and bead mills can be used.

The filling ratio of beads into the vessel can be determined by the vessel, agitation mechanism, structure, etc., and is not particularly limited. However, if the ratio is too low, the carbonaceous material may not be sufficiently pulverized or cut down. On the other hand, if the ratio is too high, a large amount of driving force is required for rotation and the beads may wear out, causing increased contamination of the treating substances to be processed. For this reason, it is recommended that the bead filling ratio be 70 to 85% of the effective volume of the vessel.

The operating conditions such as processing time, shaft rotation speed, vessel internal pressure, motor load, etc., depend on the amount of carbonaceous material to be blended and the characteristics of the resin to be dispersed, especially its viscosity and compatibility with the carbonaceous material, and can be set as appropriate for the purpose.

Prior to the dispersion process by the media mill, it is possible to perform a preliminary dispersion process using other agitating apparatus, such as a shear-type agitator such as a disper or homomixer.

By performing the dispersion treatment in this way, a dispersion with a viscosity in the range of 50-500 mPa·s, more preferably in the range of 100-400 mPa·s, and even more preferably in the range of 150-300 mPa·s is prepared.

In preparing the carbonaceous material dispersion in this way, it is desirable to process the dispersion so that the carbonaceous material in the resulting dispersion is one in which two or more particle size peaks are formed, as shown in FIG. 1, when measured by a laser diffraction particle size distribution analyzer. By forming two or more particle size peaks in this way, the agglomerated structure of carbon black, etc. can be maintained to some extent while demonstrating good dispersibility and fluidity, and thus good conductive properties can be demonstrated when forming electrodes, for example.

In particular, it is desirable to have a state in which primary particles or primary aggregates and secondary aggregates of carbon black, etc., are both present in sufficient proportions, and when measured by a laser diffraction particle size analyzer, two or more particle size peaks are formed, and the ratio of the heights of the main two peaks, P1 and P2 (P1:P2), is in a range of 1:0.7 to 0.7:1.

(Dispersant)

In preparing the carbonaceous material dispersion as described above, it is preferably desirable to add a resin-based dispersant and/or a predetermined amine compound as a dispersant in order to obtain the high flowability described above. It is particularly desirable to add both a resin-based dispersant and a predetermined amine compound.

As the resin-based dispersant, for example, polyvinyl alcohols, methyl celluloses, ethyl celluloses, hydroxypropyl methyl celluloses, polyvinyl acetals, polyvinyl pyrrolidones, etc., may be exemplified. Of these, polyvinyl alcohols and methyl celluloses are particularly preferred. The amount of this resin-based dispersant added may be about 0.01% to 5% by mass, more preferably 0.05% to 3% by mass, and even more preferably 0.1% to 2% by mass based on the total amount of the dispersion.

As the predetermined amine compound, for example, tertiary amines, secondary amines, primary amines, cyclic amines, and alkanolamines or amino alcohols, which are compounds having an amino group and a hydroxy group on the alkane skeleton thereof, or other amines such as diglycolamine, tris(hydroxymethyl) aminomethane (THAM), morpholine, etc. may be exemplified. Among these, for example, 2-methylaminoethanol, 2-amino-1-butanol, 4-ethylamino-1-butanol, triethylamine, 2-amino-2-ethyl-1,3-propanediol (AEPD), 2-amino-2-methyl-1-propanol (AMP), THAM, etc. are particularly preferred. The amount of this predetermined amine compound added may be about 0.01 to 5%, more preferably 0.05 to 3%, and even more preferably 0.1 to 2% based on the total amount of the dispersion.

(Binder)

The carbonaceous material dispersion of the present invention may further contain a binder. Alternatively, such binders can also be combined in the case of using the non-carbonaceous material dispersion of the present invention to prepare, for example, a slurry for electrodes.

As the binder to be used, for example, polymers or copolymers containing ethylene, propylene, vinyl chloride, vinyl acetate, vinyl alcohol, maleic acid, acrylic acid, acrylic ester, methacrylic acid, methacrylic ester, acrylonitrile, styrene, vinyl butyral, vinyl acetal, vinylpyrrolidone, etc. as constituent unit(s); polyurethane resins, polyester resins, phenol resins, epoxy resins, phenoxy resins, urea resins, melamine resins, alkyd resins, acrylic resins, formaldehyde resins, silicon resins, fluorine resins; rubbers such as styrene-butadiene rubbers, fluorine rubbers, etc.; conductive resins such as polyanilines, polyacetylenes, etc., may be exemplified. Modified forms, mixtures, and copolymers of these resins are also acceptable. In the lithium-ion secondary battery application, the use of polymeric compounds having fluorine atoms in their molecules, such as polyvinylidene fluoride, polyvinyl fluoride, and polytetrafluoroethylene, is particularly preferred.

The weight average molecular weight of the resin as the binder is desirably in the range of 10,000 to 2,000,000, more desirably in the range of 10,000 to 1,000,000, and further desirably in the range of 200,000 to 1,000,000. If the molecular weight is too small, the resistance and adhesiveness of the binder may be reduced. If the molecular weight is too large, the resistance and adhesiveness of the binder will improve, but the viscosity of the binder itself will increase, which will reduce workability and act as a flocculant, causing the dispersed particles to agglomerate significantly.

Due to the envisioned industrial applicability of the present invention, preferably, the binder may contain a polymer compound with fluorine atoms, more preferably, may essentially consist of a polymer compound with fluorine atoms, even more preferably may essentially consist of a vinylidene fluoride copolymer, and especially preferably may be polyvinylidene fluoride.

<Carbonaceous Material Dispersion>

The carbonaceous material dispersion according to the present invention is characterized in that it is obtained by the method for producing the carbonaceous material dispersion according to the present invention as described above, wherein a concentration of the carbonaceous material is in the range of 15 to 30% by mass based on a total mass of the dispersion, a concentration of amine components in the dispersion excluding a predetermined amine compound added as necessary is less than $3 \times 10^{-6}$ in mass fraction, and the moisture concentration in the dispersion is less than $1 \times 10^{-3}$ in mass fraction.

The concentration of the amine component in the carbonaceous material dispersion, as well as the amine-controlled concentration in the production method, should be less than $3 \times 10^{-6}$ in mass fraction, more preferably less than $2 \times 10^{-6}$, and even more preferably less than $1 \times 10^{-6}$ is desirable.

On the other hand, the moisture concentration of the carbonaceous material dispersion is less than $1 \times 10^{-3}$ in mass fraction, more preferably less than $5 \times 10^{-4}$, and even more desirably less than $2 \times 10^{-4}$. While the moisture-controlled concentration in the manufacturing method is less than $5 \times 10^{-4}$, more preferably less than $2 \times 10^{-4}$, and even more preferably less than $1 \times 10^{-4}$ in mass fraction, the moisture concentration of the product carbonaceous material dispersion is slightly increased to an acceptable range. The moisture concentration of the product carbonaceous material dispersion is slightly increased to an acceptable range. This is because even if the moisture concentration of the non-aqueous solvent used in manufacturing is controlled within the above range, the product may absorb moisture from the air during the manufacturing process or subsequent storage, and the moisture content may rise. However, even if the moisture content in the product rises slightly above the moisture-controlled concentration at the time of manufacture, there is no particular problem in terms of product characteristics. Conversely, the moisture-controlled concentration at the time of manufacture is set low in advance in anticipation of the fact that even if the product absorbs moisture from the air and the moisture concentration rises in this way, it will not affect the product characteristics.

As described above in the description of the manufacturing method for the carbonaceous material dispersion, it is desirable that the carbonaceous material is carbon black and the nitrogen-containing heterocyclic amide compound is N-methyl-2-pyrrolidone. Similarly, as described above, it is desirable that the particle size peaks are formed in two or more locations when measured by a laser diffraction particle size analyzer, and that the ratio of the heights of the main two peaks P1 and P2 (P1:22) is in the range of 1:0.7 to 0.7:1.

With respect to the carbonaceous material dispersion of the present invention, although it is not particularly limited, its viscosity may be in the range of 50 to 500 mPa·s, preferably, in the range of 100 to 400 mPa·s, and more preferably, in the range of 150 to 300 mPa·s.

(Application of Carbonaceous Material Dispersion)

The carbonaceous material dispersion according to the present invention can be further prepared as a paste for electrodes by including a binder as described above and an electrode active material as described below. In particular, it is preferable to use the carbonaceous material dispersion containing the above dispersant, carbon black as a carbonaceous material, and N-methyl-2-pyrrolidone as a nonaqueous solvent, for preparing the paste for electrodes containing the binder and the electrode active material.

(Electrode Active Material)

As the cathode active material for lithium-ion secondary batteries, for example, metal compounds such as metal oxides and metal sulfides as well as conductive polymers, which can be doped or intercalated with lithium ions, can be used, although there are no particular limitations.

For instance, inorganic compounds which includes oxides of transition metals such as Fe, Co, Ni, and Mn, complex oxides with lithium, transition metal sulfides, etc., are exemplified. Specifically, the transition metal oxide powders such as MnO, $V_2O_5$, $V_6O_{13}$, $TiO_2$, etc.; the composite oxide powders of lithium and transition metal such as layered structure lithium nickelate, lithium cobaltate, lithium manganate, spinel structure lithium manganate, etc.; olivine-structure phosphoric acid compounds such as iron phosphate lithium-based materials; and transition metal sulfide powders such as $TiS_2$ and FeS, are enumerated. Conductive polymers such as polyaniline, polyacetylene, polypyrrole, and polythiophene can also be used. A mixture of the above inorganic and organic compounds may also be used.

As the anode active material for lithium-ion batteries, there are no particular limitations as far as the material can be doped or intercalated with lithium ions. For example, it can be made of metal Li; alloys therewith such as tin alloys, silicon alloys, lead alloys, etc.; metal oxides such as $Li_xFe_2O_3$, $Li_xFe_3O_4$, $Li_xWO_2$, lithium titanate, lithium vanadate, lithium siliconate, etc.; conductive polymers such as polyacetylene, poly-p-phenylene; amorphous carbonaceous materials such as soft carbon and hard carbon; carbonaceous powder such as artificial graphite such as highly graphitized carbon materials, or natural graphite; carbon blacks, mesophase carbon black, resin-burned carbon materials, vapor-phase growth carbon fibers, carbon fibers, etc. These anode active materials may be used singly or in combination of any two or more materials.

These electrode active materials may have an average particle diameter within the range of 0.05 to 100 μm, and more preferably within the range of 0.1 to 50 μm. The average particle size of the electrode active material referred to herein is the average value of the particle size measured by electron microscopy.

This electrode paste may be prepared by mixing the above-mentioned carbonaceous material dispersion, the binder, and the electrode active material. The order of addition of each component is not limited. For example, the method of mixing all the components at once, the method of mixing the remaining components by adding them to the carbonaceous material dispersion prepared in advance by the method described above, the method of mixing the electrode active material by adding the binder to the carbonaceous material dispersion prepared in advance by the method described above, and then mixing the electrode active material in the mixture, may be enumerated.

The same apparatus used to the carbonaceous material dispersion described above may be also used to prepare the electrode paste.

EXAMPLE

The present invention will be described in more detail by way of examples below. However, it should be understood that the present invention is not limited to the following examples as long as it does not deviate from the spirit and scope of the present invention. In the following examples, "part" and "%" refer to the mass part and mass %, respectively.

Carbon black (sometimes abbreviated as "CB"), dispersants, binders, etc., used in the examples and comparative examples are listed below.
<Carbon Black>
Denka black granular product (manufactured by Denka Corporation, Japan): acetylene black, specific surface area 69 $m^2$/g.

<Non-Aqueous Solvent>
The following non-aqueous solvents were used. N-methyl-2-pyrrolidone (NMP).
Various types of NMP as a nonaqueous solvent were provided. The compositions were as follows.
  NMP-A: Distillation purified product from the waste liquid from the lithium-ion battery manufacturing process produced by Nippon Refine Co.
  NMP-B: A fresh solution of NMP that is commercially available.
  NMP-C1: A mixture of 16.67 parts of NMP-B above and 483.33 parts of NMP-A above.
  NMP-C2: A mixture of 50.00 parts of the above NMP-B mixed with 450.00 parts of the above NMP-A.
  NMP-AW1: A comparative product in which 0.01% purified water was added to the above NMP-A.
  NMP-AW2: A comparative product in which 0.05% purified water was added to the above NMP-A.
  NMP-AW3: A comparative product in which 0.10% purified water was added to the above NMP-A.
  NMP-AA1: 2-Ethyl piperidine added to the above NMP-A to obtain a mass fraction of $3 \times 10^{-6}$.
  NMP-AA2: Morpholine added to the above NMP-A to obtain a mass fraction of $3 \times 10^{-6}$.
  NMP-AA3: Triethylamine added to the above NMP-A to obtain a mass fraction of $3 \times 10^{-6}$.
<Dispersant>
  Polyvinyl Alcohol 500 (manufactured by Kanto Chemical Co., Inc.): Degree of polymerization: 500, degree of saponification: 86.5-89.0%, hereinafter abbreviated as PVA.
<The Predetermined Amine Compound>
  AEPD: 2-amino-2-ethyl-1,3-propanediol.
<Binder>
  KF Polymer W9100 (manufactured by Kureha Corporation): Polyvinylidene fluoride (PVDF), weight average molecular weight: about 280,000, hereinafter abbreviated as W9100.
<Evaluation of Carbonaceous Material Dispersion>
  The carbonaceous material dispersions obtained in Examples 1 to 14 and Comparative Examples 1 to 9 were evaluated by measuring the initial viscosity value and the rate of change in viscosity. The evaluation method is as follows.
<Initial Viscosity Value and Viscosity Change Rate>
  Dispersion stability, which is an issue in this invention, can be evaluated from the rate of change in viscosity of the resulting carbonaceous material dispersion over time. The rate of change in viscosity was evaluated by the rate of change in the measured viscosity after standing 10 days, 17 days, or 30 days at 25° C. based on the measured viscosity after dispersion (initial viscosity value). The smaller the change, the better the stability. Viscosity values were measured using a B-type viscometer ("BL" manufactured by Toki Sangyo Co., Ltd.) at a temperature of 25° C. for the dispersed composition and a rotor speed of 60 rpm for the B-type viscometer, immediately after the dispersed composition was thoroughly stirred with a spatula. The rotor used for the measurement was No. 20 for the viscosity values of less than 100 mPa·s, No. 21 for values of 100 mPa·s to 500 mPa·s, No. 22 for values of 500 mPa·s to 2000 mPa·s, and No. 23 for values of 2000 mPa·s to 1000 mPa·s, respectively.
<Concentration of Amine Components, Moisture, and Impurities in NMP>
Preliminary Test 1
  The concentration (mass fraction) of amine components, moisture (mass fraction), and solvent purity of the various NMPs as the nonaqueous solvents described above were measured by ion chromatography, Karl Fischer moisture meter, and gas chromatography, respectively.

The results showed the following analytical values, respectively.

NMP-A: Amine component concentration $0.05 \times 10^{-6}$, water content $3 \times 10^{-5}$, solvent purity 99.95%.

NMP-C1: amine component concentration $1.0 \times 10^{-6}$, water content $3 \times 10^5$, solvent purity 99.95%.

NMP-C2: amine component concentration $3.0 \times 10^{-6}$, water content $3 \times 10^{-5}$, solvent purity 99.95%.

NMP-AW1: amine component concentration $0.05 \times 10^{-6}$, water content $1.3 \times 10^{-4}$, solvent purity 99.95%.

NMP-AW2: amine component concentration $0.05 \times 10^{-6}$, water content $5.3 \times 10^{-4}$, solvent purity 99.95%.

NMP-AW3: amine component concentration $0.05 \times 10^{-6}$, water content $1 \times 10^{-3}$, solvent purity 99.94%.

NMP-B: amine component concentration $3.0 \times 10^5$, water content $3 \times 10^{-5}$, solvent purity 99.95%.

NMP-AA1: Amine component (2-ethylpiperidine) concentration $3.0 \times 10^6$, water content $3 \times 10^{-5}$, solvent purity 99.95%.

NMP-AA2: Amine component (morpholine) concentration $3.0 \times 10^{-6}$, water content $3 \times 10^{-5}$, solvent purity 99.95%.

NMP-AA3: Amine component (triethylamine) concentration $3.0 \times 10^{-6}$, water content $3 \times 10^{-5}$, solvent purity 99.95%.

Except for NMP-A, NMP-C1, and NMP-AW1, the other products were outside at least one of the allowable ranges of the predetermined amine-controlled concentration and moisture-controlled concentration of the present invention.

Preparation of Carbonaceous Material Dispersion

Example 1

To a glass bottle, 77.5 parts of NMP-A as N-methyl-2-pyrrolidone, 1 part of PVA as the dispersant, and 0.5 part of AEPD as the predetermined amine were added and thoroughly mixed and dissolved or mixed and dispersed. After mixing and dispersing, 21 parts of carbon black granular product were added and dispersed in a bead mill using zirconia beads as media until the viscosity became less than 250 mPa·s to obtain a carbonaceous material dispersion D-1. The initial viscosity of the carbonaceous material dispersion D-1 was 174 mPa·s. The peaks of the particle diameter measured by laser diffraction particle size analyzer were found at 1.01 μm and 0.25 μm, and the peak ratio was 1.0:0.9, as shown in FIG. 1.

The viscosity value of the dispersion after standing at 25° C. for 10 days was 166 mPa·s, and the rate of change in viscosity was 5%; the viscosity value of the dispersion after standing at 25° C. for 17 days was 160 mPa·s, and the rate of change in viscosity was 8%; and the viscosity value of the dispersion after standing at 25° C. for 30 days was 161 mPa·s, and the rate of change in viscosity was 8%.

Example 2

Carbonaceous material dispersion D-C1 was obtained in the same manner as in Example 1, except that NMP-C1 was used instead of NMP-A as N-methyl-2-pyrrolidone. The initial viscosity of the prepared dispersion was 212 mPa·s, and the viscosity of the dispersion after standing 30 days at 25° C. was 192 mPa·s, with a viscosity change rate of 9%.

Comparative Example 1

Carbonaceous material dispersion D-C2 was obtained in the same manner as in Example 1, except that NMP-C2 was used instead of NMP-A as N-methyl-2-pyrrolidone. The initial viscosity of the prepared dispersion was 217 mPa·s, and the viscosity of the dispersion after standing 30 days at 25° C. was 183 mPa·s, with a viscosity change rate of 16%.

Comparative Example 2

Carbonaceous material dispersion D-B was obtained in the same manner as in Example 1, except that NMP-B was used instead of NMP-A as N-methyl-2-pyrrolidone. The initial viscosity value of the prepared dispersion was 211 mPa·s, and the viscosity value of the dispersion after standing 30 days at 25° C. was 180 mPa·s, with a viscosity change rate of 15%.

Example 3

Carbonaceous material dispersion D-AW1 was obtained in the same manner as in Example 1, except that NMP-AW1 was used instead of NMP-A as N-methyl-2-pyrrolidone. The initial viscosity value of the prepared dispersion was 210 mPa·s. The viscosity value of the dispersion after standing at 25° C. for 10 days was 191 mPa·s, with a viscosity change rate of 10%.

Comparative Example 3

Carbonaceous material dispersion D-AW2 was obtained in the same manner as in Example 1, except that NMP-AW2 was used instead of NMP-A as N-methyl-2-pyrrolidone. The initial viscosity value of the prepared dispersion was 220 mPa·s, and the viscosity value of the dispersion after standing at 25° C. for 10 days was 183 mPa·s, with a viscosity change rate of 16%.

Comparative Example 4

Carbonaceous material dispersion D-AW3 was obtained in the same manner as in Example 1, except that NMP-AW3 was used instead of NMP-A as N-methyl-2-pyrrolidone. The initial viscosity value of the prepared dispersion was 223 mPa·s. The viscosity value of the dispersion after standing at 25° C. for 10 days was 183 mPa·s, with a viscosity change rate of 18%.

Referential Example 1

Carbonaceous material dispersion D-AA1 was obtained in the same manner as in Example 1, except that NMP-AA1 was used instead of NMP-A as N-methyl-2-pyrrolidone. The initial viscosity value of the prepared dispersion was 190 mPa·s, and the viscosity value of the dispersion after standing at 25° C. for 17 days was 158 mPa·s, with a viscosity change of 17%.

Referential Example 2

Carbonaceous material dispersion D-AA2 was obtained in the same manner as in Example 1, except that NMP-AA2 was used instead of NMP-A as N-methyl-2-pyrrolidone. The initial viscosity value of the prepared dispersion was 205 mPa·s, and the viscosity value of the dispersion after standing at 25° C. for 17 days was 175 mPa·s, with a viscosity change rate of 15%.

Referential Example 3

Carbonaceous material dispersion D-AA3 was obtained in the same manner as in Example 1, except that NMP-AA3 was used instead of NMP-A as N-methyl-2-pyrrolidone. The initial viscosity value of the prepared dispersion was 207 mPa·s, and the viscosity value of the dispersion after standing at 25° C. for 17 days was 179 mPa·s, with a viscosity change rate of 14%.

Example 4

To 24.5 parts of the carbonaceous material dispersion prepared in Example 1, 70.5 parts of NMP-A, the same as in Example 1, and 5 parts of binder W9100 were added, and the paste for coating was prepared by thoroughly mixing and dispersing at 60° C. for 1 hour in a stirrer. The initial viscosity value of the prepared paste for coating was 155 mPa·s, and the viscosity value of the paste after standing at 45° C. for 7 days was 599 mPa·s, suggesting sufficient workability during coating and moderate curing afterwards.

Example 5

To 24.5 parts of the carbonaceous material dispersion prepared in Example 2, 70.5 parts of NMP-C1, the same as in Example 2, and 5 parts of binder W9100 were added, and the paste for coating was prepared by thoroughly mixing and dispersing at 60° C. for 1 hour in a stirrer. The initial viscosity value of the prepared paste for coating was 165 mPa·s, and the viscosity value of the paste after standing at 45° C. for 7 days was 550 mPa·s, suggesting sufficient workability during coating and moderate curing afterwards.

Comparative Example 6

To 24.5 parts of the carbonaceous material dispersion prepared in Comparative Example 1, 70.5 parts of NMP-C2, the same as in Comparative Example 1, and 5 parts of binder W9100, were added, and the paste for coating was prepared by thoroughly mixing and dispersing at 60° C. for 1 hour in a stirrer. The initial viscosity value of the prepared paste for coating was 135 mPa·s, and the viscosity value of the paste after standing at 45° C. for 7 days was 403 mPa·s, indicating sufficient workability during coating, but a considerable decrease in subsequent curability compared to Example 4.

Comparative Example 7

To 24.5 parts of the carbonaceous material dispersion prepared in Comparative Example 2, 70.5 parts of NMP-B, the same as in Comparative Example 2, and 5 parts of binder W9100 were added, and the paste for coating was prepared by thoroughly mixing and dispersing at 60° C. for 1 hour in a stirrer. The initial viscosity of the prepared paste for coating was 128 mPa·s, and the viscosity of the paste after standing at 45° C. for 7 days was 402 mPa·s, indicating sufficient workability during coating, but a considerable decrease in subsequent curability compared to Example 4.

Referential Example 4

To 24.5 parts of the carbonaceous material dispersion prepared in Referential Example 1, 70.5 parts of NMP-AA1, the same as in Referential Example 1, and 5 parts of binder W9100 were added, and the paste for coating was prepared by thoroughly mixing and dispersing at 60° C. for 1 hour in a stirrer. The initial viscosity value of the prepared paste for coating was 140 mPa·s, and the viscosity value of the paste after standing at 45° C. for 7 days was 356 mPa·s, suggesting that the paste was not sufficiently workable during coating and that its subsequent curability was considerably lower than that of Example 4.

Referential Example 5

To 24.5 parts of the carbonaceous material dispersion prepared in Referential Example 2, 70.5 parts of NMP-AA2, the same as in Referential Example 2, and 5 parts of binder W9100 were added, and the paste for coating was prepared by thoroughly mixing and dispersing at 60° C. for 1 hour in a stirrer. The initial viscosity value of the prepared paste for coating was 136 mPa·s, and the viscosity value of the paste after standing at 45° C. for 7 days was 320 mPa-s, suggesting that there was not sufficient workability during coating and that the subsequent curability was considerably lower than that of Example 4.

Referential Example 6

To 24.5 parts of the carbonaceous material dispersion prepared in Referential Example 3, 70.5 parts of NMP-AA3, the same as in Referential Example 3, and 5 parts of binder W9100 were added, and the paste for coating was prepared by thoroughly mixing and dispersing at 60° C. for 1 hour in a stirrer. The initial viscosity value of the prepared paste for coating was 131 mPa·s, and the viscosity value of the paste after standing at 45° C. for 7 days was 316 mPa·s, suggesting that there was not sufficient workability during coating and that the subsequent curability was considerably lower than that of Example 4.

It should be understood that various changes and modifications to the presently preferred embodiments described herein will be apparent to those skilled in the art. Such changes and modifications can be made without departing from the spirit and scope of the present invention and without diminishing its attendant advantages. It is therefore intended that such changes and modifications are covered by the appended claims. The content of all references referred to herein are incorporated herein by reference in their entirety.

What is claimed is:

1. A method for producing a dispersion of carbonaceous material in a nonaqueous liquid comprising a nitrogen-containing heterocyclic amide compound, wherein the nitrogen-containing heterocyclic amide compound has a purity of 99.9% or higher as measured by gas chromatography, which comprises:

confirming a concentration of amine compounds in the nonaqueous liquid to be less than $3 \times 10^{-6}$ in mass fraction;

confirming a moisture concentration in the nonaqueous liquid to be less than $5 \times 10^{-4}$ in mass fraction; and if both the concentration of amine compounds and the moisture concentration conditions are met, dispersing a carbonaceous material in the nonaqueous liquid to obtain a carbonaceous material concentration of 15 to 30% by mass based on the total mass of the dispersion.

2. The method for producing a carbonaceous material dispersion according to claim 1, wherein the nitrogen-containing heterocyclic amide compound is a substituted or unsubstituted 2-pyrrolidone.

3. The method for producing a carbonaceous material dispersion according to claim 1, wherein the nitrogen-containing heterocyclic amide compound is N-methyl-2-pyrrolidone.

4. The method for producing a carbonaceous material dispersion according to claim 1, further comprising adding a resin-based dispersant.

5. The method for producing a carbonaceous material dispersion according to claim 1, wherein a predetermined amine compound is added as a dispersant.

6. The method for producing a carbonaceous material dispersion according to claim 4, wherein a predetermined amine compound is added as another dispersant.

7. The method for producing a carbonaceous material dispersion according to claim 1, wherein the carbonaceous material is carbon black.

8. The method for producing a carbonaceous material dispersion according to claim 1, wherein the dispersed carbonaceous material exhibits two or more particle size peaks when the dispersion is measured by a laser diffraction particle size analyzer.

9. A carbonaceous material dispersion obtained by the method for producing a carbonaceous material dispersion according to claim 1, wherein a concentration of the carbonaceous material is in the range of 15 to 30% by mass based on a total mass of the dispersion, and a concentration of amine components in the dispersion, excluding amine from a volatile pH adjuster, is less than $3\times10^{-6}$ in mass fraction, and the moisture concentration in the dispersion is less than $1\times10^{-3}$ in mass fraction.

10. The carbonaceous material dispersion according to claim 9, wherein the carbonaceous material is carbon black and the nitrogen-containing heterocyclic amide compound is N-methyl-2-pyrrolidone.

11. A carbonaceous material dispersion according to claim 9, wherein a viscosity of the dispersion is in a range of 50 to 500 mPa·s.

12. The carbonaceous material dispersion according to claim 9, wherein peaks of particle size of carbonaceous material are formed in two or more locations when measured by a laser diffraction particle size analyzer.

13. The carbonaceous material dispersion according to claim 9, wherein peaks of particle size of carbonaceous material are formed in two or more locations when measured by a laser diffraction particle size analyzer, and a ratio of heights of the main two peaks P1 and P2 (P1:P2) of these peaks is in a range of 1:0.7 to 0.7:1.

14. A method for producing a dispersion of carbonaceous material in a nonaqueous liquid comprising:
    obtaining a nonaqueous liquid comprising a nitrogen-containing heterocyclic amide compound, wherein the nonaqueous liquid:
        has a purity of 99.9% or higher of the nitrogen-containing heterocyclic amide compound as measured by gas chromatography;
        has a concentration of amine compounds of less than $3\times10^{-6}$ in mass fraction;
        has a moisture concentration of less than $5\times10^{-4}$ in mass fraction; and
    dispersing a carbonaceous material in the nonaqueous liquid to obtain a dispersion having a carbonaceous material concentration of 15 to 30% by mass based on the total mass of the dispersion.

15. The method for producing a dispersion of carbonaceous material in a nonaqueous liquid according to claim 14, wherein a rate of change in viscosity of the dispersion evaluated by the rate of change in the measured viscosity after standing 10 days at 25° C., based on the measured viscosity after dispersion (initial viscosity value), is not more than 10%.

\* \* \* \* \*